3,427,423
METHOD OF AND APPARATUS FOR ELECTRIC DISCHARGE MACHINING WITH AIR DIELECTRIC
Thomas J. O'Connor, Ann Arbor, Mich., assignor to Easco Products, Inc., Ann Arbor, Mich., a corporation of Michigan
Filed Aug. 5, 1964, Ser. No. 387,614
U.S. Cl. 219—69          5 Claims
Int. Cl. B23k 9/16

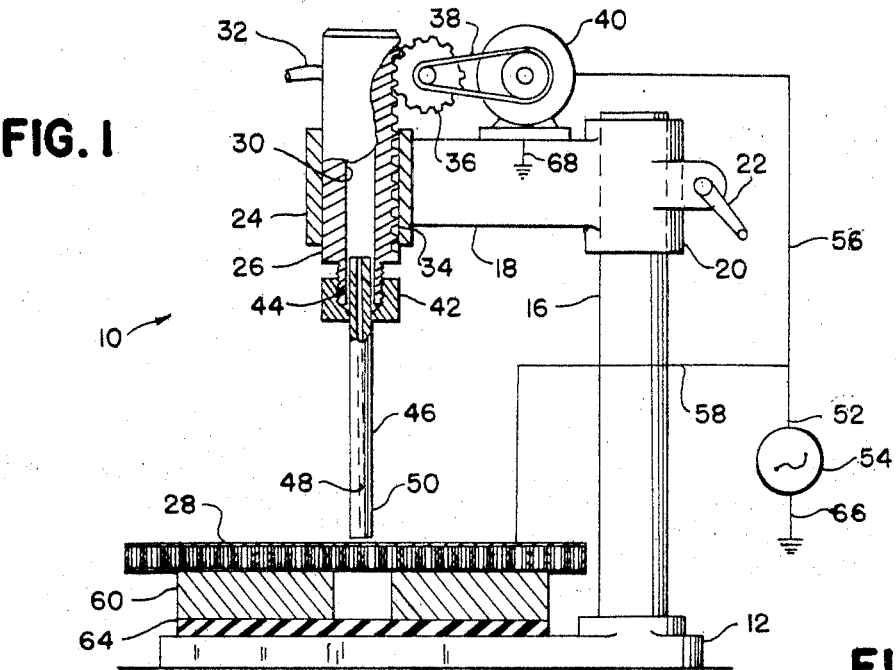
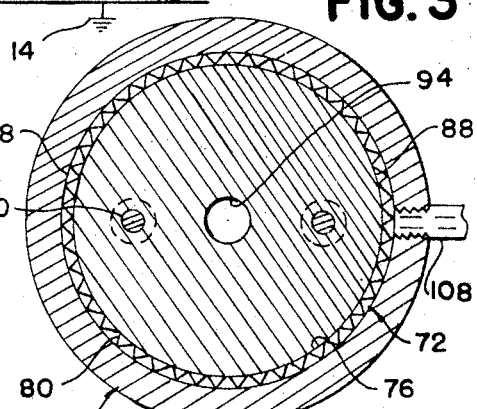
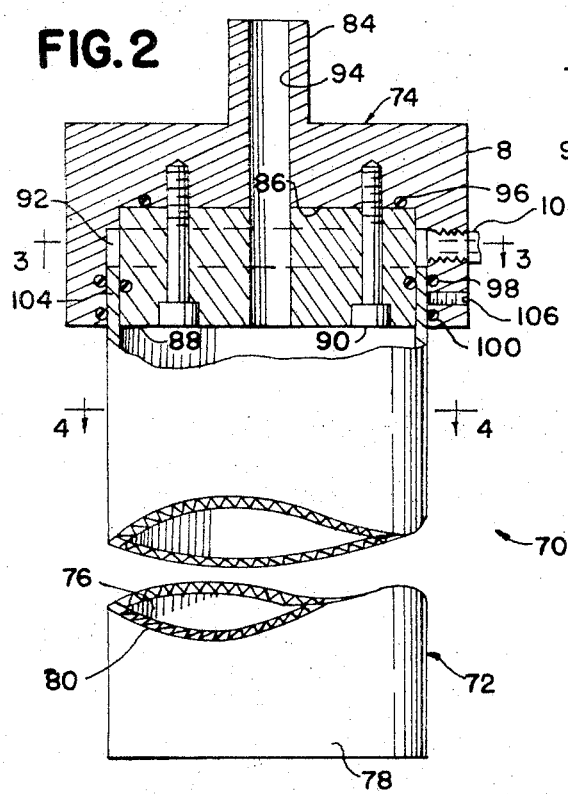
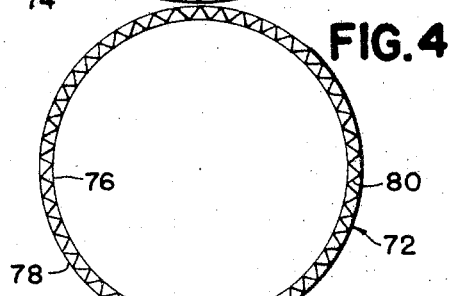
INVENTOR.
THOMAS J. O'CONNOR
BY Whittemore,
Hulbert & Belknap
ATTORNEYS INVENTOR.
THOMAS J. O'CONNOR
BY Whittemore,
Hulbert & Belknap
ATTORNEYS United States Patent Office 3,427,423
Patented Feb. 11, 1969

ABSTRACT OF THE DISCLOSURE

A method of electrical discharge machining without using a liquid dielectric is disclosed, including connecting a highly conductive workpiece and a conductive electrode to opposite terminals of a source of electrical energy, moving the workpiece and electrode into close proximity and passing air through the spark gap at a high velocity. A structure for performing the method includes a hollow electrode having discrete axial passages therethrough for passing air longitudinally of the electrode and withdrawing air axially of the electrode, and a holder for securing the electrode to an electrical discharge machining head. A structure is also disclosed for facilitating passing of air under pressure through the spark gap between the electrode and workpiece without the discrete axial passages in the electrode, including an air-tight jacket adapted to be positioned between the electrode and workpiece. A quick-change electrode holding tool is also provided for machining of openings substantially larger in diameter than the electrode used by moving the electrode in a circular path.

---

In the past the electric machining of metal has been accomplished by connecting the opposite terminals of a source of pulsating electric energy to an electrode and a workpiece and feeding the electrode and workpiece toward each other to establish and maintain a predetermined spacing therebetween in the presence of a dielectric fluid so that sparking between the electrode and workpiece occurs in the presence of the dielectric fluid.

Such operation has in the past been considered to require a dielectric fluid in the spark gap between the electrode and workpiece. Thus the usual practice has been to provide a tank into which the workpiece is placed and which is filled with the dielectric fluid. The size of the workpiece which could be electrically machined has therefore generally been limited in the past to the physical size of the dielectric tank of the electric discharge machining apparatus.

In addition, a liquid dielectric will contaminate workpieces so that expensive drying operations are necessary in conjunction with electric machining of metal missile components and the like which experience high heat in use to prevent explosion of the workpiece in use due to vaporized dielectric absorbed by or retained in the workpiece during the electric machining operation.

It is therefore one of the objects of the present invention to provide an improved method of electric machining of conductive materials.

Another object is to provide improved apparatus for electric machining of conductive materials.

Another object is to provide a method of electric machining of metal without use of a liquid between an electrode and workpiece.

Another object is to provide a method of electric discharge machining of a material which conducts electricity comprising connecting an electrode and a workpiece to opposite terminals of a source of pulsating electric energy moving the electrode and workpiece into close proximity to produce sparks therebetween in an air gap between the electrode and workpiece.

Another object is to provide a method of electric machining of a conductive workpiece as set forth above wherein the air is passed through the gap between the workpiece and electrode under pressure.

Another object is to provide apparatus for electric discharge machining of conductive material comprising means for producing a source of pulsating electric energy, means for connecting the opposite terminals of the source of electrical energy to a workpiece and an electrode and means for producing and maintaining a predetermined spacing between the workpiece and electrode.

Another object is to provide apparatus as set forth above and further including structure for passing air through the electrode and between the electrode and workpiece.

Another object is to provide apparatus as set forth above wherein the structure for passing air between the electrode and workpiece comprises a jacket surrounding the electrode and engaged with the surface of the workpiece having a connection from a source of air under pressure.

Another object is to provide apparatus as set forth above and further including structure for moving the electrode in a circle over the surface of the workpiece.

Another object of the invention is to provide an electrode including means for passing air axially thereof including an inner and outer cylindrical member separated by a corrugated cylindrical spacing member and structure for feeding air to one end of the electrode between the inner and outer cylindrical members.

Another object of the invention is to provide an electrode as set forth above wherein the structure for supplying air to the electrode comprises a cylindrical body member having a recess in one side thereof and a disc positioned within the recess having an external diameter smaller than the internal diameter of the recess forming an annular slot in assembly with the body member for receiving the ends of the cylindrical members, and means for passing air through the body member into the annular slot.

Another object is to provide a quick change tool for use in electric discharge machining apparatus comprising a body member having an elongated slot therein and including a dovetail mounting abutment thereon, a pair of pulleys of different size within the slot at opposite ends thereof and connected together by endless drive means, a motor mounted on one end of the body member having a drive shaft connected to drive one of the pulleys, a rotatable shaft extending through the body member at the other end thereof and connected to the other pulley for rotation therewith, an electrode holding arm one end of which is secured to the shaft for rotation therewith and means for securing an electrode to the electrode holding arm at the other end thereof.

Another object is to provide a quick change tool as set forth above and further including structure for feeding air through the shaft and arm and an electrode secured to the arm.

Other objects and features of the invention will become apparent as the description proceeds, especially when taken in conjunction with the accompanying drawings illustrating a preferred embodiment of the invention, wherein:

FIGURE 1 is a diagrammatic, partially broken away, elevation view of electric discharge machining apparatus constructed in accordance with the invention.

FIGURE 2 is an enlarged, partly broken away, elevation view of an electrode constructed in accordance with the invention for use in the electric discharge machining apparatus illustrated in FIGURE 1.

FIGURE 3 is a cross section of the electrode illustrated in FIGURE 2 taken substantially on the line 3—3 in FIGURE 2.

FIGURE 4 is a cross section of the electrode illustrated in FIGURE 2 taken substantially on the line 4—4 in FIGURE 2.

Figure 5:
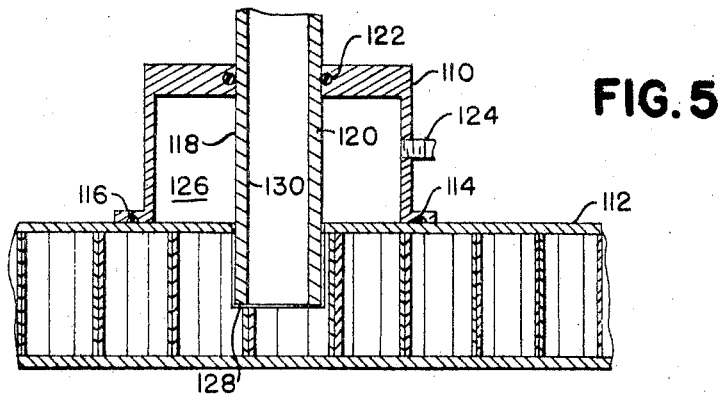
FIGURE 5 is a section view of an electrode for use in electric discharge machining apparatus as illustrated in FIGURE 1 with a jacket in conjunction therewith for use in supplying air under pressure between the workpiece and the electrode.

With particular reference to the figures of the drawings one embodiment of the present invention will now be considered in detail.

The electric discharge machining apparatus 10 illustrated in FIGURE 1 includes the base 12, which is electrically grounded at 14, the column 16 supported by the base and extending vertically therefrom, and the arm 18 having the bearing sleeve 20 on one end thereof positioned over the column 16. Locking structure 22 is provided to secure the arm 18 in a vertically adjusted position on the column 16.

A bearing sleeve 24 is provided on the other end of the arm 18 for guiding the head 26 for vertical movement toward and away from the workpiece 28. Head 26 has an axial opening 30 extending therethrough, through which air may be introduced or exhausted as desired through air conduit 32. Head 26 is also provided with rack teeth 34 on one side thereof in engagement with the pinion 36 which is driven through endless belt 38 from reversible electric motor 40.

Chuck structure 42 for securing the shank 44 of an electrode 46 to the head 26 is secured to head 26. The electrode 46 as shown is provided with an axial passage 48 therein through which air may be passed in either direction.

Electrically the motor 40 is connected to one terminal 50 of the source of pulsating electric energy 54 through conductor 56 in the usual manner. The workpiece 28 which may be a honeycomb panel constructed of electrically conducting material, such as titanium for aircraft and missile members, is connected to the terminal 52 through the conductor 58. Workpiece 28 is supported on the blocks 60 which are positioned on the insulating pad 64 on base 12. The circuit through the motor 40 is completed to the other terminal 66 of the energy source 54 through a ground connection 68 while the circuit from the workpiece 28 is completed across an air gap to the electrode 46 and through the head, arm, column and base of the apparatus 10 to ground 14.

Motor 40 serves to maintain a predetermined spacing between the electrode 46 and the workpiece 28 as cutting of the workpiece 28 progresses in response to the electric signal across the air gap between the electrode 46 and the workpiece 28 in the usual manner.

It will be particularly noted that no dielectric tank is provided in conjunction with the electric discharge machining apparatus 10 and that no fluid dielectric is used with the apparatus 10.

In operation the electrode 46 and workpiece 28 are positioned as shown in FIGURE 1 with a predetermined gap maintained between the electrode 46 and workpiece 28 by the servo motor 40. Electric signals having the usual frequency and power for electric discharge machining are applied between the workpiece 28 and electrode 50 to produce sparking therebetween. Simultaneously air is forced through the passage 30 in the head 26 and the passage 48 in the electrode 46 and radially outwardly of the electrode through the gap between the electrode and workpiece. The air may be under a considerable pressure, such as for example two hundred pounds per square inch.

Electric machining of the workpiece 28 is thus accomplished without a liquid dielectric present which in prior methods of electric erosion machining has caused a residual moisture in the workpiece 28 requiring expensive drying processes or possible rupture of the workpiece 28 when it is subsequently subjected to high heat.

It is hypothesized that the air particularly when under pressure and thus at a fairly high velocity acts to blow away the molten particles of metal before they can resolidify to cause shorts between the electrode 46 and workpiece 28. Thus small particles of splatter may be found adjacent the cut when no fluid dielectric is used.

If the splatter is considered objectionable around the periphery of the cut and a cleaning operation is not desirable, it is possible to remove the splatter almost entirely by drawing the air out through the electrode 46 and head 30 thus tending to move the splatter inward and into the electrode rather than outwardly onto the workpiece 28.

While air has been indicated as being the material passed through the electrode during machining without a liquid dielectric, other non-dielectric materials such as inert gases like argon for example may be used with good cutting efficiency.

To further reduce the splatter about an electrically machined opening in a workpiece 28 and to make more efficient use of air passed through the spark gap during machining, a special electrode assembly 70, as best shown in FIGURES 2–4, has been developed. The electrode assembly 70 includes an electrode 72 constructed of the usual material, such as brass for example and an electrode holder 74.

The electrode 72 includes the inner cylindrical sleeve 76 and the outer cylindrical sleeve 78 separated by the corrugated cylindrical sleeve 80. The three sleeves 76, 78 and 80 are rigidly connected to form a single electrical unit.

The electrode holder 74 comprises the body member 82 having the mounting shank 84 extending from one side thereof and including the recess 86 in the opposite side thereof. A disc 88 is secured within the recess 86 by convenient means, such as the bolts 90, to provide the annular slot 92 between the body member 82 and the disc 88. An axial passage 94 extends through the disc 88 and the body member 82, as shown best in FIGURE 2. Annular seals 96, 98 and 100 are provided between the body member 82 and the disc 88 of the electrode holder 74 and the end 104 of the electrode 72 positioned within the annular slot 92, as best shown in FIGURE 2. The electrode 72 is secured within the annular slot 92 by convenient means, such as a set screw 106.

In operation air is passed into the annular groove 92 through an air conduit 108 from a source of air (not shown) and proceeds through the electrode 72 along the passages provided between the inner and outer cylindrical members 76 and 78 formed with the corrugated central portion 80. Thus, particularly efficient use of air at the exact air gap is provided through the use of electrode 70.

Splatter is prevented from collecting around the periphery of an opening cut with the electrode assembly 70 on exhausting of air through the center of the electrode 72 and the passage 94 with the electrode 72 in use in apparatus 10, as illustrated in FIGURE 1.

Another structure for reducing splatter around the edge of an opening cut with electric discharge machining apparatus 10 without the use of liquid dielectric is illustrated in FIGURE 5. In FIGURE 5 the inverted hat-shaped jacket 110 is positioned over a workpiece 112 which, as illustrated, is again a piece of honeycombed titanium material for use in missiles and aircraft. The jacket 110 is sealed to the portion of the workpiece 112 in which it is desired to form an opening by convenient means, such as the flange 114 and annular sealing ring 116 coupled with pressure applied on the top of jacket 10 by convenient means (not shown). The jacket 110 is either constructed of insulating material, such as plastic, or is separated from the workpiece 112 by an insulating sealing gasket (not shown).

The electrode 118 connected to apparatus, such as that illustrated in FIGURE 1, is then inserted through the opening 120 in jacket 110 which is sealed by O-ring 122. The electrode 118 is then moved into position with respect to the workpiece 112 to produce sparking therebetween while air is passed into the jacket 110 through air conduit 124 from a source of air (not shown). The air in chamber 126 will then move through the spark gap around and beneath the electrode periphery 128 and into the axial passage 130 in electrode 118 to remove the molten splatter into the interior of the workpiece 112 or into the interior of the electrode 130 where it is not objectionable.

Figure 6:
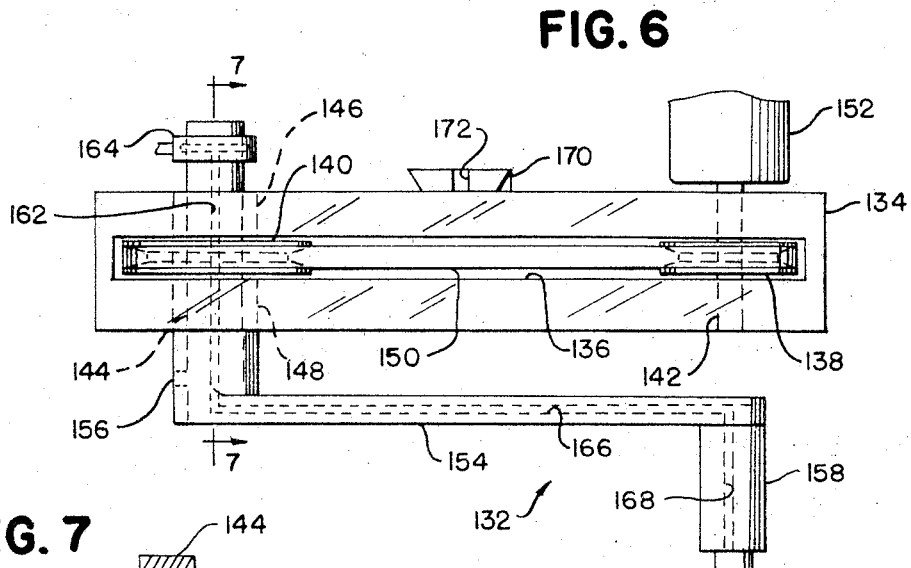
FIGURE 6 is a quick change tool for use with electric discharge machining apparatus as illustrated in FIGURE 1 for cutting large diameter holes in workpieces with a relatively small diameter electrode.
Figure 7:
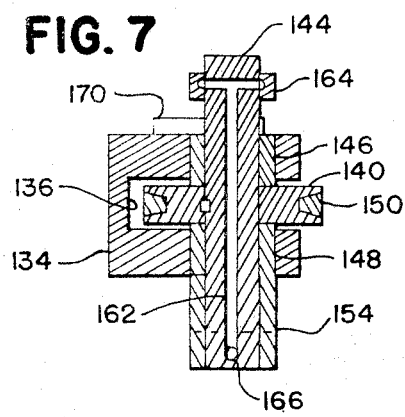
FIGURE 7 is a transverse section view of the quick change tool illustrated in FIGURE 6 taken on the line 7—7 in FIGURE 6.

Should it be considered desirable to cut a larger diameter opening in a workpiece, such as workpieces 28 and 112 than is provided for with the electrode sizes available, the quick change tool 132 illustrated in FIGURES 6 and 7 which is constructed for use with the quick-change electrodes system for spark-cutting apparatus disclosed in Patent No. 3,222,494, the quick change tooling apparatus 132 may be used. The quick change tool 132 includes an elongated rectangular body member 134 having an elongated slot 136 therein in which pulleys 138 and 140 are mounted for rotation on motor shaft 142 and shaft 144 respectively. Bearings 146 and 148 are provided in conjunction with the shaft 144 and may be provided in conjunction with the motor shaft 142 if desired.

The pulleys 138 and 140 are connected by means of the belt drive 150 to produce rotation of pulley 140 and shaft 144 connected thereto for rotation therewith on energization of the electric servo motor 152 and pulley 138 connected to the motor shaft 142 for rotation therewith.

Rotation of shaft 144 produces rotation of electrode holder arm 154 which is connected to the shaft 144 at one end by convenient means, such as set screws 156, about an axis through the shaft 144. Such rotation of the electrode holder arm 154 causes the chuck 158 for the electrode 160 to pass the electrode 160 through a circle of diameter limited only by the length of the arm 154 of the electrode holder.

Air is passed axially through the shaft 144 through passage 162 from the slip air coupling 164 and through the passages 166 and 168 in the arm 154 and chuck 158 of the electrode holder to the electrode 160. The quick change tool 132 is provided with the dovetail mounting abutment 170 having locating slot 172 therein as more fully described in the above referenced copending patent application.

Thus in operation with the quick change tool 132 the entire body member 134 may be moved downward in accordance with the movement of the head 26 of electric discharge machining apparatus 10 by servo motor 40, while the motor 152 may be connected to the lead 56 in apparatus 10 to sweep the electrode 160 in a circle of predetermined diameter thereby producing a predetermined opening in a workpiece, the diameter of which is substantially larger than the diameter of electrode 160.

While one embodiment of the invention and modifications thereof have ben disclosed in detail, other embodiments and modifications of the invention are contemplated. It is therefore the intention to include all such embodiments and modifications as are defined by the appended claims within the scope of the invention.

What I claim as my invention is:

1. An electrode for use in electric discharge machining of conductive material comprising an electrode holder having an axial passage extending therethrough, an electrode member including a conductive inner cylindrical sleeve, a conductive outer cylindrical sleeve, and a corrugated conductive central cylindrical sleeve electrically and rigidly connected to the inner and outer cylindrical sleeves to provide discrete passages therebetween whereby air may be passed axially of the electrode member through the discrete passages and the air may be exhausted through the inner cylindrical sleeve and through the axial passage in the electrode holder.

2. Structure as set forth in claim 1 wherein the electrode holder comprises a cylindrical body member having a mounting shank extending from one end thereof and a recess in the other end thereof and a disc secured in the recess providing an annular slot between the body member and disc and means for securing an end of a cylindrical electrode member in the annular slot.

3. Structure as set forth in claim 2 wherein the electrode holder further includes means for sealing between the electrode member and body member, between the disc and body member, and between the disc and electrode member, and means for introducing air under pressure into the annular groove.

4. Structure for electric discharge machining of a conductive workpiece comprising a source of pulsating electric energy, an electrode member comprising a conductive, inner cylindrical sleeve, a conductive, outer cylindrical sleeve and a corrugated, conductive, central cylindrical sleeve electrically and rigidly connected to the inner and outer cylindrical sleeves to provide discrete passages therebetween, means for connecting the electrode to one terminal of the source of electric energy, means for connecting the workpiece to the other terminal of the source of electric energy, means for advancing the electrode toward the workpiece and to maintain a spark gap therebetween and means for passing air between the inner and outer cylindrical sleeves of the electrode and through the spark gap.

5. Structure for electric discharge machining of a conductive workpiece comprising a source of pulsating electric energy, an electrode member comprising a conductive, inner cylindrical sleeve, a conductive, outer cylindrical lseeve and conductive spacing means between the inner and outer cylindrical sleeves rigidly connected to the inner and outer cylindrical sleeves to provide discrete passages therebetween, means for connecting the electrode to one terminal of the source of electric energy, means for connecting the workpiece to the other terminal of the source of electric energy, means for advancing the electrode toward the workpiece and to maintain a spark gap therebetween and means for passing air between the inner and outer cylindrical sleeves of the electrode and through the spark gap.

References Cited

UNITED STATES PATENTS

| 2,718,581 | 9/1955 | Thomas | 219—69 |
| 2,308,860 | 1/1943 | Clark | 219—69 X |
| 2,385,665 | 9/1945 | Warwick | 219—69 |
| 3,144,541 | 8/1964 | Hill | 219—69 |
| 2,427,588 | 9/1947 | Burnett | 219—69 |
| 3,035,151 | 5/1962 | Weglarz | 219—69 |

OTHER REFERENCES

Williams, R. O.: "Elements of Electro-Discharge Machining" (Copr. 1957 by Cincinnati Milling Machine Co.) pp. 1 and 5.

RICHARD M. WOOD, *Primary Examiner.*

R. F. STAUBLY, *Assistant Examiner.*

U.S. Cl. X.R.

219—120, 145